May 29, 1934.  E. C. BULLARD  1,960,296

MACHINE TOOL CONTROL MECHANISM

Filed Nov. 17, 1932

INVENTOR.
EDWARD C. BULLARD
BY
A. T. Sperry
ATTORNEY.

Patented May 29, 1934

1,960,296

UNITED STATES PATENT OFFICE 1,960,296

MACHINE TOOL CONTROL MECHANISM

Edward C. Bullard, Southport, Conn., assignor to The Bullard Company, a corporation of Connecticut Application November 17, 1932, Serial No. 643,041

11 Claims. (Cl. 74—473)

This invention relates to control mechanisms and while the invention is generally applicable for the control of widely different types of instrumentalities, it is specifically applicable to power transmission controls such as for the selecting of gear contacts in a gear transmission and may be applicable as well for controlling a clutch or clutches either in combination with a gear control or for the control of clutches alone.

It is among the prime objects of the invention to provide a single simple instrumentality operable to selectively move a plurality of control rods.

A further object is to provide in combination with a conventional ball and socket or H-slot type of controller means for actuating an independent control element.

A further object is to provide in a control mechanism a minimum number of manually operable devices for operating a maximum number of control elements.

Another more specific object is to provide in combination with a pair of gear shifting rods and their controlling lever means operable by the lever independent of its control of the rods for actuating a third and, if desired, independent controller.

Among the other objects of the invention, it will be apparent from a consideration of the drawing and the following specification, is to provide a single, simple unitary mechanism providing maximum control with a minimum number of parts and whereby a single handle control may be utilized for the control of a large number of control elements.

While the invention is broadly applicable to control all types of mechanism and particularly for the control of clutches and gears, it is here illustrated as being arranged for the control only of gear shifting elements. Obviously, the inventive concept is not confined to the specific structural elements as shown. The invention consists in providing in conjunction with a pair of control rods, such as are used in the shifting of gears in a transmission and their gear lever, means operable by rotation of the lever to move through mechanical linkage another control element which may be a part of the same transmission or which may be an independent instrumentality.

In the drawing

Figure 1:
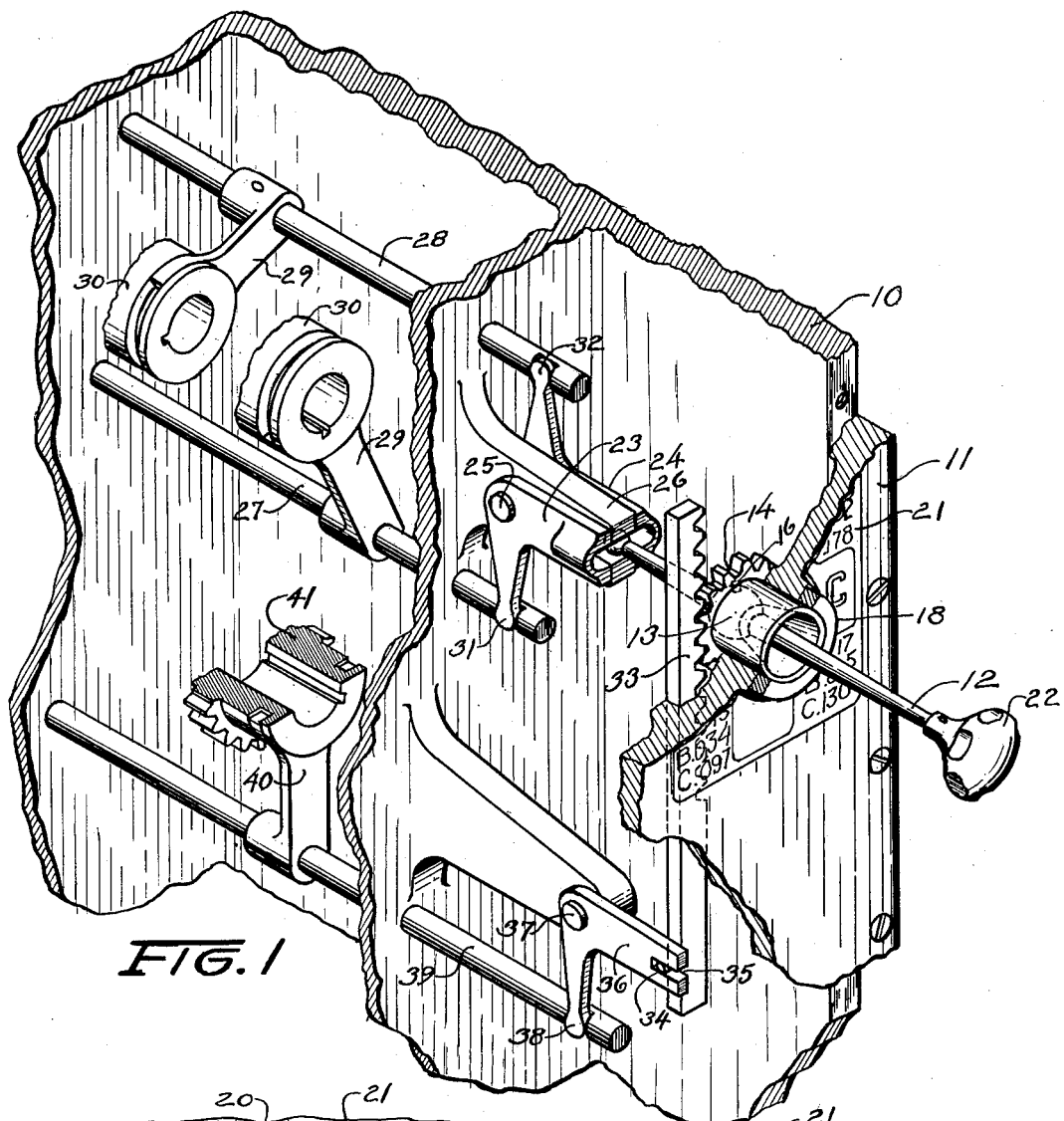
Fig. 1 is an isometric view of the invention as applied to a transmission casing.

In Fig. 1 of the drawing, the numeral 10 indicates the transmission housing, the front face of which is closed by an apertured cover 11 through which extends the shifting lever 12. The lever 12 is mounted for rotary and pivotal movement through the cover by the provision of a ball 13 formed intermediate the ends of the lever and mounted in a complementary socket formed within a rotatably disposed gear member 14, the ball being secured within its socket by the provision of the threaded cooperative collar 15. Rotation of the lever will be transmitted to the gear member by means of a pin 16 extending from the ball and being received within a keyway 17 of the socket. The gear is rotatably secured through the aperture of the cover 11 by a fitted collar 18 which engages the protruding hub of the gear, thus the gear is held against the inner face of the boss 19 which surrounds the aperture. The collar 18 is also provided with an indicating pointer 20 which is adapted to move with the socket and to cooperate with suitable indicia of an indicator plate 21 as will be hereinafter referred to. By virtue of this mounting or an equivalent arrangement, the lever is universally and rotatably mounted so that manipulations thereof, through its knob handle 22, may affect rotation of the gear 14 while the lever is in any one of its adjusted pivotal positions or during movement from one pivotal position to another. Thus, it will be seen that, through a suitable connection, one form of which is illustrated, the lever 12 may, by rotation, actuate one or more independent controllers regardless of its actuation of other controls by its pivotal movement.

As in conventional control shifting mechanisms, the inner end of the lever 12 is provided with a spherical tip which by pivotal movement of the lever is adapted to selectively engage a conforming slot in the outer ends of control bell crank levers 23 and 24, both of which may be suitably pivoted on the pin 25 in a fixed bracket 26 within the housing. The forward end of the bracket is preferably of bifurcated formation whereby it forms a neutral passage for the transverse pivotal movement of the inner end of the lever.

In the form of the invention illustrated, the rods 27 and 28 are depicted as being gear shifting rods, each one carrying a gear shifting fork 29 which is adapted to translate by endwise movement cooperating gears which are fragmentarily illustrated as at 30. The forward ends of the rods 27 and 28 are adapted for permanent engagement with the inner ends 31 and 32 of the cranks 23 and 24 whereby selective pivotal movement of either crank in either direction will rectilinearly slide the rods thereby to effect translation of the gears actuated thereby through the forks 29.

While this portion of the structure is illustrated and described in detail, it will be understood that the invention may partake of any desired type of control structure, and that the invention is generally applicable to any ball and socket or H-slot type of control mechanism.

For actuating one or more independent controllers through the lever 12, the gear 14 meshes with the cooperating gear teeth on a rack bar 33 which will be reciprocated through rotation of the lever. The rack bar 33 may engage through any suitable instrumentality one or more independent or cooperating control rods. As an illustration of one structural embodiment of this concept, the lower end of the rack 33 is provided with a pin 34 which is adapted to be engaged within the bifurcated end 35 of a bell crank lever 36 which is pivoted at 37 and which, as illustrated, may be of similar form to the bell cranks 23 and 24. Its opposite end 38 engages a control rod 39 which by way of illustration is shown as carrying a gear shifting fork 40 which is adapted to translate a gear, fragmentarily illustrated at 41. It is obviously within the scope of the invention to provide a plurality of rods 39 which might be shifted in unison or which might be independently shifted by movement of the pin 34 from the bifurcations of one crank to the bifurcations of another or through other suitable actuating means.

An important feature of the invention is the fact that the angular position of the lever 12 will not disturb the relation of the gear and rack nor will the rotation of the gear by the lever be effected since the pin and slot engagement therebetween will form a universal transmission joint therebetween. It is also to be noted that the rotation of the shafts will in no way effect the movements of the cranks 23 and 24 and their associated rods. Thus, it will be possible to independently move the auxiliary control rod or rods independently of the setting of the primary rods and conversely, the primary rods 27 and 28 may be shifted independently of the position of the auxiliary rod 39.

Figure 2:
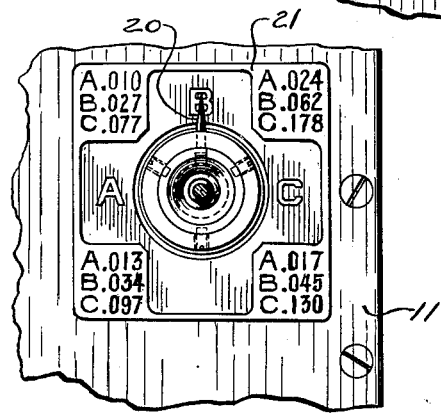
Fig. 2 is a fragmentary front elevation showing the indicator plate and shifting lever.
Figure 3:
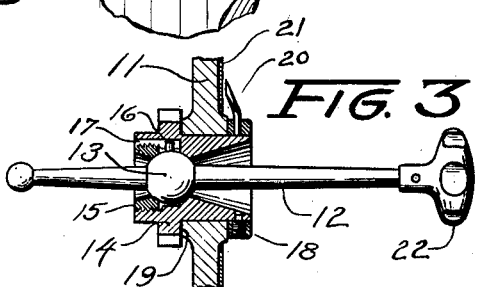
Fig. 3 is a detail sectional view of the lever mounting.

As illustrated in Fig. 2, the indicator plate 21 carries suitable major indicia such as the letters A, B and C with which the pointer 20 will register its setting of the auxiliary control. Associated therewith are four sets of indicia numerals, one arranged in each position of pivotal adjustment of the lever 12. As indicated, these sets may contain three numerals each, each numeral being tabulated with reference to the major indicia so that as in the case of a three-rod transmission mechanism a combined reading of the major indicia of the numerals will give the operator an indication of the gear contacts in any selected position of the lever. Obviously, the numerals shown are merely illustrative and will of course vary with the specific operation of the invention.

While the invention is herein described and illustrated with respect to structural detail, it is obvious that the invention is broadly applicable and numerous changes and modifications and the full use of equivalents may be used without departing from the spirit or scope of the appended claims.

Having thus set forth the nature of my invention, what I claim is:

1. In a machine tool gear shifting mechanism, a casing, a pair of gear shifting rods mounted therein, a shifting lever pivotally and rotatably mounted through said casing, means for shifting one of said rods by pivotal movement of said lever, a gear rotatable with said lever and forming a pivotal socket for said lever.

2. A pivotal and rotatable shift lever mounting including an apertured supporting casing, a lever having a ball formed thereon intermediate its ends, a pivotal socket for said ball within said aperture and a gear mounted on the socket, said socket being engaged with said lever for rotation thereby.

3. A pivotal and rotatable shift lever mounting including a supporting casing, a hollow gear rotatably mounted therethrough, a socket formed within said gear, a lever having a ball formed intermediate its ends and received within said socket and means for rotating said gear through rotation of said lever.

4. A mounting for a pivotal and rotatable gear shifting lever comprising a sleeve having a gear connected thereto.

5. A mounting for a pivotal and rotatable gear shifting lever comprising a sleeve having a gear connected thereto, and means connecting said lever with said gear for communicating rotary movement of said lever to said gear.

6. A mounting for a pivotal and rotatable gear shifting lever comprising a sleeve having a gear connected thereto, and a control means operable independent of the pivotal movement of the shifting lever by rotation of said gear.

7. The combination with the mounting of a pivoted shifting lever of a gear mounted independent of the pivotal movement of said lever and forming the fulcrum of said lever.

8. The combination with the mounting of a pivoted shifting lever of a gear mounted independent of the pivotal movement of said lever and forming the fulcrum of said lever, and means for rotating said gear from said lever.

9. The combination with the mounting of a pivoted shifting lever of a gear mounted independent of the pivotal movement of said lever and forming the fulcrum of said lever, and a controller operable by rotation of said gear.

10. The combination with an intermediately pivoted rotatable shifting lever, the inner end of which is adapted by pivotal movement to selectively engage and actuate one or another of a pair of independent actuated members of a gear forming the fulcrum for said lever and rotatable thereby and an independent control means operable upon rotation of said gear.

11. The combination with an intermediately pivoted rotatable shifting lever, the inner end of which is adapted by pivotal movement to selectively engage and actuate one or another of a pair of independent actuated members of a gear forming the fulcrum for said lever and rotatable thereby, and an independent control means operable upon rotation of said gear, said means including a rack having tooth enmeshment with said gear.

EDWARD C. BULLARD.